US012562064B2

(12) United States Patent
Aoki et al.

(10) Patent No.: US 12,562,064 B2
(45) Date of Patent: Feb. 24, 2026

(54) SERVER APPARATUS

(71) Applicant: TOYOTA JIDOSHA KABUSHIKI KAISHA, Toyota (JP)

(72) Inventors: Takahiro Aoki, Saitama (JP); Yuta Takata, Toyota (JP); Haruki Oguri, Toyota (JP); Takashi Yamazaki, Nagoya (JP); Tsuyoshi Okada, Nagoya (JP); Hiroki Asao, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 18/418,954

(22) Filed: Jan. 22, 2024

(65) Prior Publication Data

US 2024/0249627 A1 Jul. 25, 2024

(30) Foreign Application Priority Data

Jan. 24, 2023 (JP) ................................. 2023-009001

(51) Int. Cl.
*G08G 1/00* (2006.01)
*B60L 58/13* (2019.01)
(52) U.S. Cl.
CPC .............. *G08G 1/202* (2013.01); *B60L 58/13* (2019.02); *G08G 1/205* (2013.01); *B60L 2240/62* (2013.01); *B60L 2260/52* (2013.01)
(58) Field of Classification Search
CPC ........ G08G 1/202; G08G 1/205; B60L 58/13; B60L 2240/62; B60L 2260/52; B60L 53/66; B60L 53/68; B60L 58/12; G05B 23/0213; G05B 2219/24065
See application file for complete search history.

(56) References Cited

U.S. PATENT DOCUMENTS

| | | | |
|---|---|---|---|
| 9,007,020 B2* | 4/2015 | Prosser | B60L 53/53 320/109 |
| 11,814,035 B2* | 11/2023 | Nishida | B60W 20/40 |
| 12,393,238 B2* | 8/2025 | Joao | H05K 7/20881 |
| 2018/0143035 A1* | 5/2018 | Ricci | B62D 15/0265 |
| 2019/0126768 A1* | 5/2019 | Niwa | G07C 5/004 |
| 2022/0299337 A1* | 9/2022 | Joao | H02J 7/00032 |
| 2025/0018818 A1* | 1/2025 | Swaminathan | B60L 53/665 |

FOREIGN PATENT DOCUMENTS

| | | |
|---|---|---|
| JP | 2013-228238 A | 11/2013 |
| JP | 2019-093968 A | 6/2019 |

* cited by examiner

*Primary Examiner* — Thomas Ingram
(74) *Attorney, Agent, or Firm* — Dinsmore & Shohl LLP

(57) ABSTRACT

A server apparatus includes a communication interface, and a controller configured to communicate with vehicles using the communication interface, acquire information on a required charge amount and a position of a vehicle that needs to be charged, and provide instructions that a power supply vehicle that does not have the required charge amount is to travel a route where road surface power supply is available to the position.

4 Claims, 3 Drawing Sheets

SERVER APPARATUS

CROSS-REFERENCE TO RELATED APPLICATION

This application claims priority to Japanese Patent Application No. 2023-009001, filed on Jan. 24, 2023, the entire contents of which are incorporated herein by reference.

TECHNICAL FIELD

The present disclosure relates to a server apparatus.

BACKGROUND

Battery electric vehicles (BEVs) or the like powered by batteries may run out of power, namely, run out of electricity, while traveling. Various technologies for eliminating or avoiding such situations have been proposed. For example, Patent Literature (PTL) 1 discloses a technology to charge a vehicle running out of electricity from another vehicle.

CITATION LIST

Patent Literature

PTL 1: JP 2019-093968 A

SUMMARY

The vehicle for charging the vehicle running out of electricity does not always have a sufficient remaining battery level, which may cause a risk that the vehicle running out of electricity cannot be reliably rescued.

It would be helpful to provide a server apparatus or the like that enables more reliable rescue of vehicles running out of electricity.

A server apparatus according to the present disclosure includes:

a communication interface; and a controller configured to:

communicate with vehicles using the communication interface;

acquire information on a required charge amount and a position of a vehicle that needs to be charged; and provide instructions that a power supply vehicle that does not have the required charge amount is to travel a route where road surface power supply is available to the position.

According to the server apparatus or the like in the present disclosure, vehicles running out of electricity can be rescued more reliably.

DETAILED DESCRIPTION

Embodiments are described below.

Figure 1:
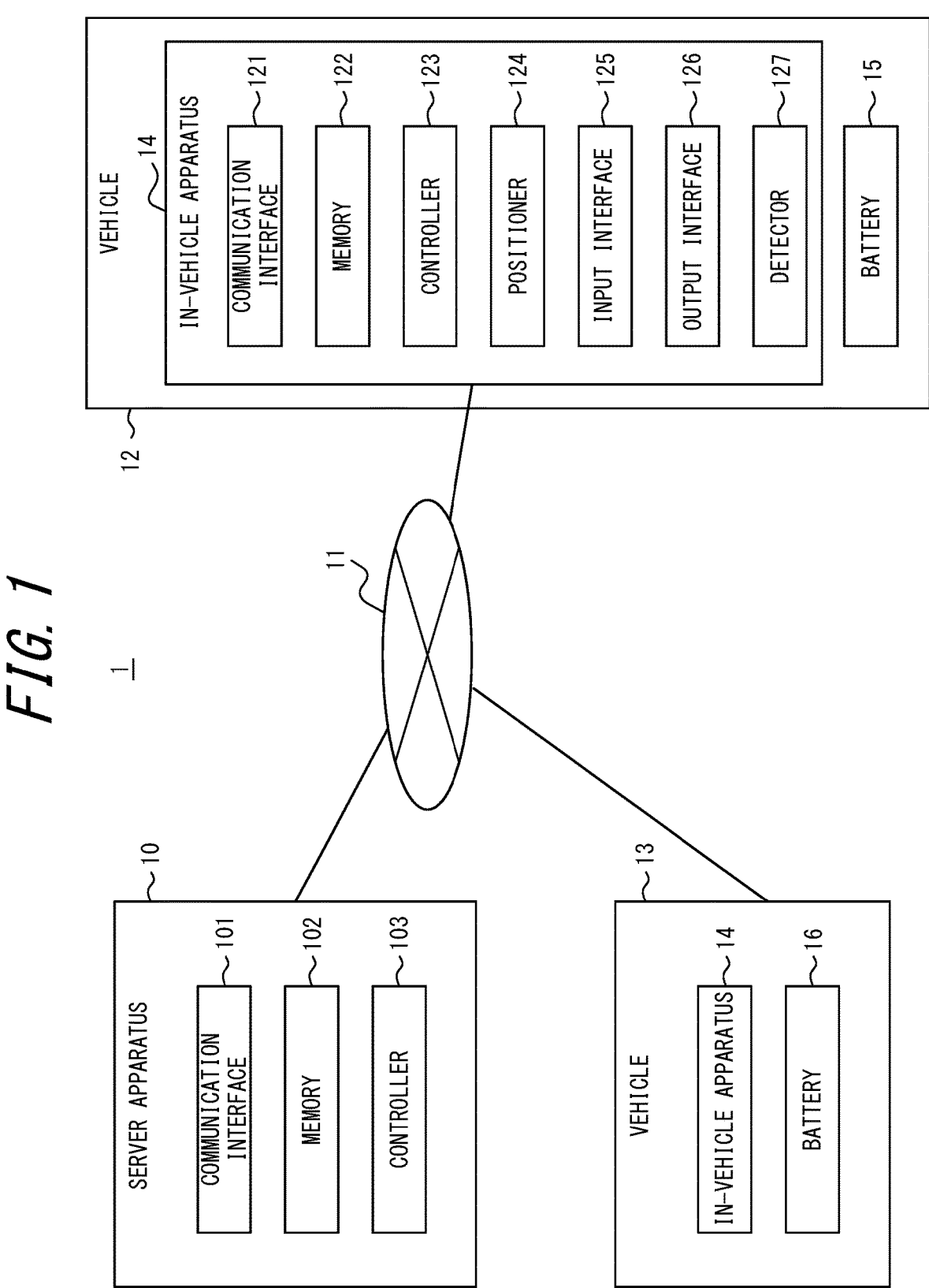
FIG. 1 is a diagram illustrating an example configuration of a vehicle management system.

FIG. 1 is a diagram illustrating an example configuration of a vehicle management system according to an embodiment. The vehicle management system 1 includes one or more each of a server apparatus 10 and the vehicles 12 and 13 communicably connected to each other via a network 11. The server apparatus 10 is, for example, a server computer that belongs to a cloud computing system or other computing system and functions as a server that implements various functions. The vehicles 12 and 13 are passenger cars, commercial vehicles, or the like provided with communication functions and information processing functions and connect to the network 11 via a mobile communication network. The vehicles 12 and 13 may each be driven by a driver, or the driving may be automated at any level. The vehicle 12 is any type of automobile driven by the power of the on-board battery 15, such as a Battery Electric Vehicle (BEV), a Hybrid Electric Vehicle (HEV), a Plug-in Hybrid Electric Vehicle (PHEV), or a Fuel Cell Electric Vehicle (FCEV). The vehicle 13 carries a battery 16 to feed the battery 15 of the vehicle 12. The vehicle 13 is, for example, a gasoline automobile, or a BEV, HEV, PHEV, FCEV, or the like driven by the power from the battery 16. The vehicles 12 and 13 are hereafter referred to as a vehicle 12 to be charged and a power supply vehicle 13, respectively. The network 11 is, for example, the Internet, but may include an ad hoc network, a LAN, a metropolitan area network (MAN), or other networks, or any combination thereof.

In the present embodiment, the vehicle management system 1 is a system for supporting rush charging by the power supply vehicle 13 for the vehicle 12 to be charged that has run out of power. Rush charging is a mode of supplying power by moving the power supply vehicle 13 to the position of the vehicle 12 to be charged and charging the battery 15 of the vehicle 12 to be charged from the battery 16 of the power supply vehicle 13. In the vehicle management system 1, the server apparatus 10 has a communication interface 101 and a controller 103 that communicates with the vehicle 12 to be charged and the power supply vehicle 13 by the communication interface 101. When the controller 103 acquires information on a required charge amount (hereinafter referred to as "required charge amount") and a position (hereinafter referred to as "feeding position") of a vehicle 12 to be charged that needs to be charged, it provides instructions that the power supply vehicle 13 does not have the required charge amount to travel along a route where road surface power supply is available (hereinafter referred to as "road surface feed route") to the feeding position. A surface-fed route is a route that passes through a road where surface-fed equipment is installed. The roadside feeder system is designed to supply the power supply vehicle 13 in motion. The road surface power supply facility may for example, charge the battery 16 of the power supply vehicle 13 contactlessly by electromagnetic induction of coils embedded in the road surface, or it may charge the battery 16 as the power supply vehicle 13 travels with its electrodes in contact with feeder wires laid on the road surface or guardrail. When the power supply vehicle 13 performs a drive-in charging to the vehicle 12 to be charged that is out of power, it can obtain the required charge amount on its way to the power-feeding position without having to stop at a power-feeding station to obtain the required charge amount. Thus, it is possible to more reliably rescue the vehicle 12 to be charged that is out of power.

Next, the configuration of the server apparatus 10 is described. The server apparatus 10 includes a communication interface 101, a memory 102, and a controller 103. The server apparatus 10 is, for example, a single computer. The server apparatus 10 may be two or more computers that are communicably connected to each other and operate in cooperation. In this case, the configuration illustrated in FIG. 1 can be arranged among two or more computers as appropriate.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the vehicle 12 to be charged and the power supply vehicle 13 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The functions of the server apparatus 10 are realized by a processor included in the controller 103 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

The next section describes an example configuration of the vehicle 12 to be charged. The vehicle 12 to be charged has an in-vehicle apparatus 14 and a battery 15. The in-vehicle apparatus 14 includes a communication interface 121, a memory 122, a controller 123, a positioner 124, an input interface 125, an output interface 126, and a detector 127. One or more of these parts may also be configured as a single control apparatus, or may be configured by a personal computer including a tablet terminal, a smartphone terminal, a navigation apparatus, or the like. Alternatively, each component may be communicably connected via an in-vehicle network compliant with a standard such as controller area network (CAN). The battery 15 is, for example, a lithium-ion battery. Each part of the in-vehicle apparatus 14 is configured, for example, to be operable by the battery 15 even when the vehicle 12 to be charged is parked and the accessories are off.

The communication interface 121 includes one or more interfaces for communication. Examples of the interface for communication include an interface corresponding to mobile communication standards, such as LTE, 4G, or 5G. The communication interface 121 receives information to be used for the operations of the controller 123 and transmits information obtained by the operations of the controller 123. The controller 123 connects to the network 11 using the communication interface 121 through a mobile communication base station and communicates information with other apparatuses via the network 11.

The memory 122 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 122 functions as, for example, a main memory, an auxiliary memory, or a cache memory. The memory 122 stores information to be used for the operations of the controller 123 and information obtained by the operations of an in-vehicle apparatus 14.

The controller 123 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 123 executes information processing related to operations of the vehicle 12 to be charged while controlling components of the in-vehicle apparatus 14.

The positioner 124 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 124 acquires positional information for the vehicle 12 to be charged.

The input interface 125 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 125 accepts operations for inputting information to be used in the operations of the controller 123 and transmits the inputted information to the controller 123.

The output interface 126 includes one or more interfaces for output. The interface for output is, for example, a display or a speaker. The display is, for example, a Liquid Crystal Display (LCD) or an organic Electro Luminescent (EL) display. The output interface 126 outputs information obtained by the operations of the controller 123.

The detector 127 interfaces with or has one or more sensors that detect the status of various parts of the vehicle 12 to be charged. Sensors include, for example, sensors that detect the remaining battery level of the battery 15 and sensors that detect the motion state (speed, forward/backward acceleration, left/right acceleration, deceleration, etc.)

of the vehicle 12 to be charged. The detector 127 sends information indicating each state detected by the sensor to the controller 123.

The functions of the controller 123 are realized by a processor included in the controller 123 executing a control program. The control program is a program for causing a computer to execute the processing of steps included in operations of the controller 123, thereby enabling the computer to realize the functions corresponding to the processing of the steps. That is, the control program is a program for causing a computer to function as the controller 123. Some or all of the functions of the controller 123 may be realized by a dedicated circuit included in the controller 123.

The power supply vehicle 13 has an in-vehicle apparatus 14 and a battery 16, which are equivalent to the vehicle 12 to be charged. The battery 16 includes a battery to charge the battery 15 of the vehicle 12 to be charged. The battery 15 may include a battery to provide power for driving the power supply vehicle 13.

Figure 2:
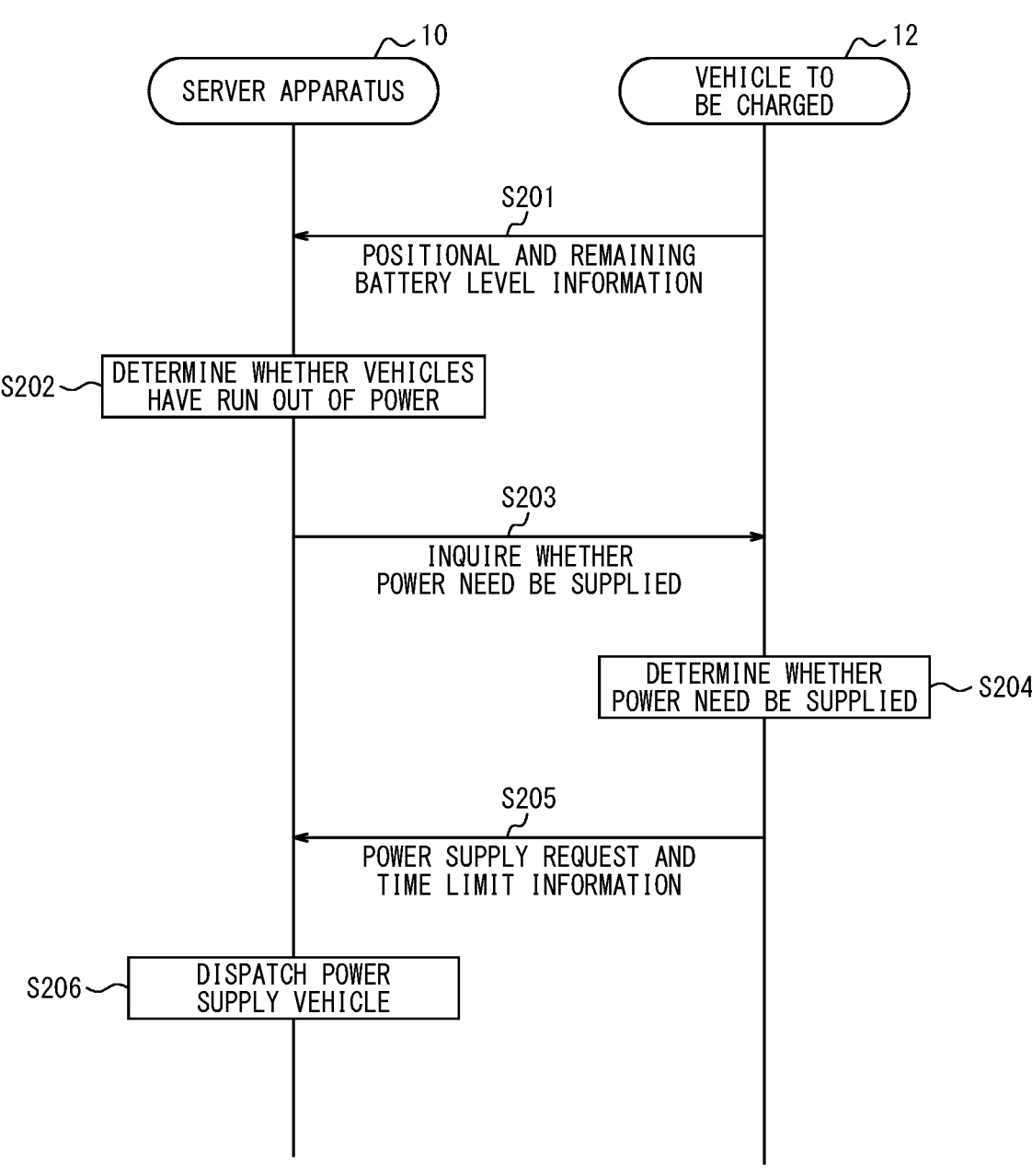
FIG. 2 is a diagram illustrating an example operation procedure of a server apparatus and a vehicle to be charged.

FIG. 2 is a sequence diagram to illustrate the operation procedure by the server apparatus 10 and the vehicle 12 to be charged in the present embodiment. The operating procedure in FIG. 2 is the operating procedure performed by the server apparatus 10 and one vehicle 12 to be charged, and is performed for each union of the server apparatus 10 and each vehicle 12 to be charged in a plurality of vehicles 12 to be charged. The operations of the server apparatus 10 and the vehicle 12 to be charged in FIG. 2 are performed by the controller 103 of the server apparatus 10 and the controller 113 of the vehicle 12 to be charged, respectively. The exchange of information between the server apparatus 10 and the vehicle 12 to be charged is performed by the controller 103 and the controller 113 sending and receiving information via the communication interface 101 and the communication interface 111, respectively. The operation procedures in FIG. 2 are performed in any appropriate cycles, for example, in cycles of several milliseconds to several seconds.

In step S201, the vehicle 12 to be charged transmits its own positional information and remaining battery level information to the server apparatus 10. This information is sent out together with the identification information for each of the vehicles 12 to be charged. The remaining battery level information is, for example, the SOC (State of Charge) value of the battery 15. Along with the positional information, information about the destination of the vehicle 12 to be charged or the distance to the destination may be sent to the server apparatus 10.

In step S202, the server apparatus 10 determines the power outage status of the vehicle 12 to be charged. The server apparatus 10 determines for each vehicle 12 to be charged whether the remaining battery level of the vehicle 12 to be charged is above an arbitrary criterion. The server apparatus 10 determines that the vehicle 12 to be charged having the remaining battery level less than the standard is out of power. The reference is an arbitrarily set SOC value, e.g., any value from a few percent to 20%. The criteria may be determined based on the distance to the destination. For example, the server apparatus 10 can derive the distance from the current position of each vehicle 12 to be charged to the destination based on map information, and use that distance as a reference for the remaining battery level required for the vehicle 12 to be charged to travel. The map information is stored in the memory 102 in advance. The server apparatus 10 may derive the model of each vehicle 12 to be charged and the electric cost of that model based on the identification information of each vehicle 12 to be charged, and determine the criteria based on the electric cost. Such information on electric costs for each vehicle type is stored in the memory 102 in advance.

In step S203, the server apparatus 10 sends information to the vehicle 12 to be charged that is determined to be out of power to ask whether or not it needs to be powered.

In step S204, the vehicle 12 to be charged determines whether or not it needs to be powered by an arbitrary algorithm according to the information received from the server apparatus 10. For example, the system determines that power is required when its own remaining battery level falls below a preset criterion for each of the vehicles 12 to be charged to be powered. Alternatively, the vehicle 12 to be charged may output information indicating the remaining battery level to the occupant along with information indicating a strike from the server apparatus 10, and the occupant may determine whether or not power should be supplied and input the results of the determination to the vehicle 12 to be charged.

In step S205, the vehicle 12 to be charged sends a power supply request and time limit information to the server apparatus 10 according to the result of the judgment that power supply is necessary. The time limit information indicates the time at which the power supply should be completed. Such time is determined, for example, by calculating backward from the arrival time at the destination set in the navigation system of the vehicle 12 to be charged, as the time at which the vehicle 12 should complete power supply and start moving toward the destination. Alternatively, the occupant may enter the time at which he or she wishes to complete powering the vehicle 12 to be charged.

In step S206, the server apparatus 10 dispatches the power supply vehicle 13 according to the feeding request received from the vehicle 12 to be charged, using an arbitrary algorithm.

Steps S201 to S203 may be omitted, and a power supply request may be sent to the server apparatus 10 after the need for power supply is determined at the vehicle 12 to be charged. In such cases, information on the position of the vehicle 12 to be charged and the remaining battery level is sent to the server apparatus along with the power supply request.

Figure 3:
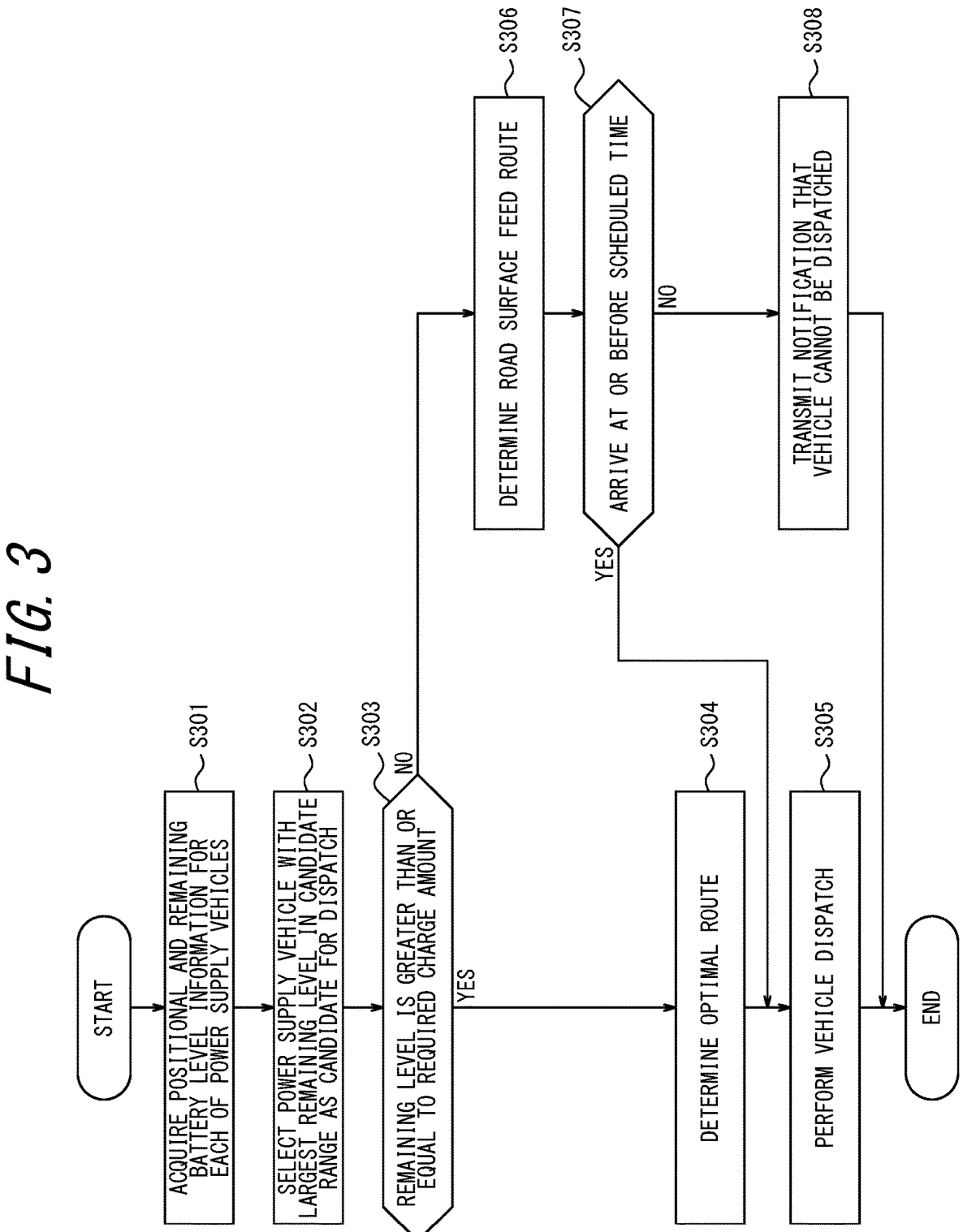
FIG. 3 is a diagram illustrating an example operation procedure of the server apparatus.

FIG. 3 is a flowchart diagram illustrating the operation of the server apparatus 10 for dispatching the power supply vehicle. The procedure in FIG. 3 corresponds to the detailed procedure in step S206 of FIG. 2 and is performed by the controller 103 of the server apparatus 10. If more than one of the vehicles to be charged 12 is determined to be out of power, the procedure in FIG. 3 is performed for each of the vehicles 12 to be charged.

In step S301, the controller 103 acquires positional and remaining battery level information for each of the power supply vehicles 13 from power supply vehicles 13. The controller 103 sends a request for positional and remaining battery level information to one or more of the power supply vehicles 13 by the communication interface 101. In response, the in-vehicle apparatus 14 in the power supply vehicle 13 sends out information on the vehicle's position and remaining battery level. This information is sent out together with the identification information for each of the power supply vehicles 13. The remaining battery level information is, for example, the SOC value of the battery 16. The controller 103 receives the information sent out by the power supply vehicles 13 by the communication interface 101.

In step S302, the controller 103 selects the power supply vehicle 13 with the largest remaining battery level in the candidate range as candidates for allocation. The candidate range is the position of the vehicle 12 to be charged that has been determined to be out of power, i.e., an arbitrary distance range from the feeding position. Such an arbitrary distance range is, for example, the range of distances from the current time to the time when the power feeding time is brought forward from the time when the power feeding needs to be completed (hereinafter referred to as "scheduled time") to reach the power feeding position at the legal speed.

In step S303, the controller 103 determines whether the remaining battery level of the power supply vehicle 13 selected as a candidate vehicle is greater than or equal to the required charge amount to the battery 15 of the vehicle 12 to be charged that is out of power. The required charge amount is the charge amount required to charge the battery 15 to the remaining amount that would eliminate the power shortage condition, i.e., to the standard when the power shortage condition is determined in step S202. If battery 15 has more than the required charge amount (Yes in step S303), the controller 103 proceeds to step S304; if the battery 15 does not have more than the remaining required charge amount (No in step S303), the controller 103 proceeds to step S306.

In step S304, the controller 103 determines the optimal route for the power supply vehicle 13. The optimal path is, for example, the path that can reach the feeding position from the current position in the shortest distance or time. The server apparatus 10 determines the optimal route using map information by an arbitrary algorithm.

Meanwhile, in step S306, the controller 103 determines a road surface feeding route for the power supply vehicle 13 to get from its current position to the feeding position. A surface-fed route is a route that passes through a road that has surface-fed facilities installed in part or all of it. The location of the roadside feeder facility is stored in the memory 102, corresponding to the map information. The information on the passing distance of the road surface power supply facility and the charge amount available for charging is pre-correlated and stored in the memory 102. Using this information, the controller 103 uses an arbitrary algorithm to derive a route such that the power supply vehicle 13 passes through roads with surface feeder facilities long enough to charge more than the required charge amount.

In step S307, the controller 103 determines whether the power supply vehicle 13 can arrive at the feeding position by the scheduled time if it travels along the surface feeding route. Based on the map information, the controller 103 derives the arrival time at the feeding position when the power supply vehicle 13 travels along the surface feeding route, and determines whether it is before or after the scheduled time. In a case in which the arrival is possible before the scheduled time (Yes in step S307), the controller 103 proceeds to step S305, and in a case in which the arrival is not possible (No in step S307), the controller 103 proceeds to step S308.

In step S305, the controller 103 performs vehicle dispatch. The controller 103 sends instructions to the power supply vehicle 13 to travel from the current position to the feeding position on the optimal route, if an optimal route has been determined, or on the road surface feeding route, if a road surface feeding route has been determined. The power supply vehicle 13 starts moving in response to the instructions or outputs the contents of the instructions by the occupant and travels to the feeding position by the occupant's operation. Then, upon arrival at the feeder position, charging is executed from the power supply vehicle 13 to the vehicle 12 to be charged.

On the other hand, in step S308, the controller 103 sends a notification to the vehicle 12 to be charged that the vehicle cannot be dispatched. The Unable to Dispatch notification includes information indicating that there are no power supply vehicles 13 available to charge the required charge amount and travel to the feeding position by the scheduled time. The vehicle 12 to be charged outputs a notification to the occupant of the vehicle that the vehicle cannot be dispatched. The occupants can, for example, consider alternative measures in response to such output.

After step S305 or S308, the process in FIG. 3 ends.

Even if a notice of non-allocation is sent to the vehicle 12 to be charged in one of the processing cycles in FIG. 3, for example, the processing cycle in FIG. 3 can be executed in any cycle, for example, from a few seconds to a few minutes, during which the position of the power supply vehicle 13 change and the candidates for allocation are replaced, so that the probability that a power supply vehicle 13 that can be allocated can be determined can be increased. Alternatively, instead of step S308, the controller 103 may shorten the surface feed route by any algorithm and return to step S307 to determine if it can arrive before the scheduled time. The controller 103 may then perform dispatch of the power supply vehicle 13 by a shortened surface feed route that allows them to arrive before the scheduled time. By doing so, it is possible to quickly eliminate, even partially, the lack of power in the vehicle 12 to be charged.

According to the method described above, a quick drive-in charging can be performed, which more reliably rescues the vehicle 12 to be charged that is out of power.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each element, each step, or the like can be rearranged without logical inconsistency, and a plurality of elements, steps, or the like can be combined into one or divided.

The invention claimed is:

1. A server apparatus comprising:
   a communication interface; and
   a controller configured to:
   communicate with vehicles using the communication interface;
   acquire information on a required charge amount and a position of a vehicle that needs to be charged;
   derive a route to the position such that a power supply vehicle that does not have the required charge amount autonomously passes through a road with a surface feeder facility long enough to charge more than the required charge amount, the route passing through the road that has the surface feeder facility installed in part or all of it to provide a road surface power supply, information on a passing distance of the surface feeder facility and a charge amount available for charging being pre-correlated and pre-stored to derive the route; and
   provide instructions that the power supply vehicle autonomously travels along the route,
   wherein in response to the instructions, the power supply vehicle autonomously travels along the route.

2. The server apparatus according to claim 1, wherein the controller is configured to provide the instructions under a condition that the power supply vehicle can arrive at the position by a predetermined time when traveling the route where road surface power supply is available.

3. The server apparatus according to claim 2, wherein the predetermined time is a charging start time such that charging to the required charge amount is completed by a time the vehicle starts to travel to a destination.

4. The server apparatus according to claim 1, wherein the controller is configured to:

acquire, from the vehicle, information on a remaining battery level of the vehicle and a destination; and derive the required charge amount based on the information on the remaining battery level and the destination.

\* \* \* \* \*